E. HARRIS.
Page-Indicator for Books.

No. 168,395.  Patented Oct. 5, 1875.

WITNESSES
B. W. Williams
R. George

INVENTOR
Elbridge Harris
By his Att'ys
Henry W. Williams & Co.

UNITED STATES PATENT OFFICE.

ELBRIDGE HARRIS, OF BOSTON, MASSACHUSETTS.

IMPROVEMENT IN PAGE-INDICATORS FOR BOOKS.

Specification forming part of Letters Patent No. 168,395, dated October 5, 1875; application filed June 28, 1875.

*To all whom it may concern:*

Be it known that I, ELBRIDGE HARRIS, of Boston, in the county of Suffolk and State of Massachusetts, have invented a new and Improved Page-Indicator for Books; and I do hereby declare that the following is a full, clear, and exact specification of the same, reference being had to the accompanying drawings, and to the letters of reference marked thereon.

This invention is intended to be used to indicate the number of the page of a book—as, for example, the page at which a person has left off reading, or at which one wishes to refer occasionally—and it obviates the necessity for a book-mark, the necessity for turning down leaves, or of remembering any particular page.

Any number can be easily and quickly registered by means of this device, even if it have reference to any other subject, but its principal use is its application to books.

The nature of the invention in detail is below described.

Figure 1:
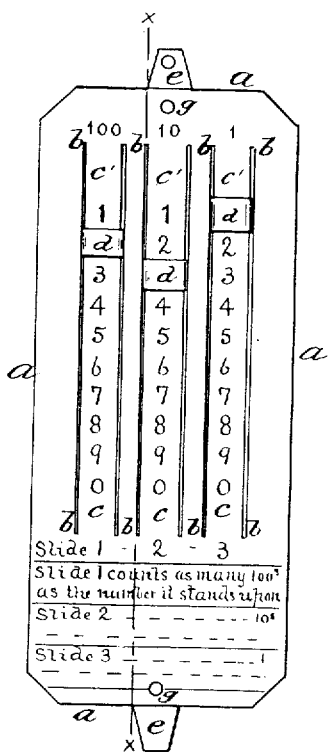
Figure 2:

In the accompanying drawing, Figure 1 is a plan view of my device, and Fig. 2 is a section upon the line $x\ x$.

Similar letters of reference indicate corresponding parts.

$a$ is a piece of card-board or other suitable material, having printed upon it three columns of figures. Each column consists of the numerals 1 2 3 4 5 6 7 8 9 0, as in the drawing. Over the left-hand column is the explanatory number 100. Over the center column is the number 10. Over the right-hand column is the number 1. Upon each side of each column the card-board $a$ is cut in parallel incisions, $b$, making three strips, $c$. A space, $c'$, is left in each strip $c$ above the column of numerals. Folded around, or partially around, each strip $c$ is a slide, $d$. The slide upon the left-hand column is marked slide 1; that under the center column is marked slide 2; and that under the right-hand column, slide 3. Beneath the columns are placed directions for use.

When the register is not in use, the slides are all placed over the spaces $c'$ above the columns.

Now, if a person, in reading a book, has left off reading at page 231, the slide $d$ (1) upon the hundreds' column—that is, the left-hand column—is placed over the figure 2 in said column, so as to hide it. The slide 2 upon the center (tens') column is placed over figure 3. The slide 3 upon the right-hand column is placed over figure 1 in said column. When the book is again taken up the register indicates that the page at which to commence reading is page 231.

A lining, $f$, is placed upon the back of the register, in order to produce the necessary friction to keep the slides in place.

This is important, as the slides when a little worn may be a trifle too loose, and slip out of place. This would be especially apt to happen if the device should warp up from the fly-leaf, or be hung up. The lining in such instances would be needed to keep the slides in place.

The pieces $e\ e$ are placed between the lining and the register, and may be inserted in incisions in the fly-leaf of a book, so that the device may be always in place at the beginning or end of the book.

The openings $g\ g$ may be used, if desired, in hanging up the device.

It will be found that the most convenient manner of moving the slides is with the finger or thumb nail.

The device may be kept anywhere, between the leaves of the book, &c.; but the most convenient way will be to make two cuts in a fly-leaf parallel with the top or bottom of the leaf, and to insert the projecting pieces $e\ e$ in the said cuts, as above mentioned.

Of course, as many strips $c$ and columns may be provided as desirable or necessary.

The back of the lining may be prepared with mucilage, if desired, so that it may adhere to the fly-leaf.

Having thus fully described my invention, what I claim, and desire to secure by Letters Patent, is—

In combination with the base $a$, provided with lining $f$ and projecting pieces $e\ e$, the strips $c$, formed by means of parallel cuts $b$, and provided with slides $d$, substantially as and for the purpose set forth.

ELBRIDGE HARRIS.

Witnesses:
 HENRY W. WILLIAMS,
 JNO. D. PATTEN.